US007248415B2

(12) United States Patent
Kwon et al.

(10) Patent No.: US 7,248,415 B2
(45) Date of Patent: Jul. 24, 2007

(54) OPTICAL DEFLECTOR (75) Inventors: Oh Kee Kwon, Daejeon (KR); Kang Ho Kim, Daejeon (KR); Hyun Soo Kim, Daejeon (KR); Jong Hoi Kim, Daejeon (KR); Kwang Ryong Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/237,043

(22) Filed: Sep. 28, 2005

(65) Prior Publication Data

US 2006/0082894 A1    Apr. 20, 2006

(30) Foreign Application Priority Data

Oct. 18, 2004    (KR)    ............... 10-2004-0083334

(51) Int. Cl.
*G02B 3/00* (2006.01)
*G02B 5/04* (2006.01)
*G02F 1/295* (2006.01)

(52) U.S. Cl. ........................... 359/652; 359/837; 385/8
(58) Field of Classification Search .............. 359/648, 359/652, 831, 837; 385/4, 8
See application file for complete search history.

(56) References Cited

U.S. PATENT DOCUMENTS

| 4,872,746 | A | 10/1989 | Kobayashi |
| 6,025,864 | A | 2/2000 | Nashimoto |
| 6,385,355 | B1 | 5/2002 | Nashimoto et al. |
| 6,485,149 | B1* | 11/2002 | Berg et al. .................. 359/615 |
| 2003/0091265 | A1 | 5/2003 | Lin et al. |
| 2003/0112838 | A1 | 6/2003 | Oh et al. |

OTHER PUBLICATIONS

'InGaAsP/InP Laser Diodes Monolithically Integrated with Waveguide-Type Light Deflectors' Kim et al., Japanese Journal of Applied Physics, vol. 43, No. 4B, 2004, pp. L543-L544.
'Design and Simulation of Waveguide Electrooptic Beam Deflectors' Chiu et al., IEEE Journal Of Lightwave Technology, vol. 13, No. 10, Oct. 1995, pp. 2049-2052.
'Guided-Wave Electro-Optic Beam Deflector Using Domain Reversal in LiTaO$_3$' Chen et al., IEEE Journal Of Lightwave Technology, vol. 12, No. 8, Aug. 1994, pp. 1401-1404.
'A Thin-Film Polymeric Waveguide Beam Deflector Based on Thermooptic Effect' Jang et al., IEEE Photonics Technology Letters, vol. 13, No. 5, May 2001, pp. 490-492.

* cited by examiner

*Primary Examiner*—Ricky Mack
*Assistant Examiner*—William Choi
(74) *Attorney, Agent, or Firm*—Ladas & Parry LLP

(57) ABSTRACT

Provided is an optical deflector for deflecting radiation beams. The optical deflector includes: a peripheral region having a first effective refractive index; and a deflection pattern region having a predetermined shape and a second effective refractive index, wherein the second effective refractive index differs from the first effective refractive index. Here, due to the deflection pattern region having the predetermined shape, the radiation beams are deflected in a direction starting from a certain point. By using the optical deflector, the locus of a light source can be designed in one of various forms, such as a straight line, a circle, an ellipse, or a parabola.

7 Claims, 8 Drawing Sheets

OPTICAL DEFLECTOR

CROSS-REFERENCE TO RELATED APPLICATION

This application claims priority to and the benefit of Korean Patent Application No. 2004-83334, filed Oct. 18, 2004, the disclosure of which is incorporated herein by reference in its entirety.

BACKGROUND

1. Field of the Invention

The present invention relates to an optical deflector that deflects radiation beams.

2. Discussion of Related Art

An optical deflector is used to improve data access time in CD players or magneto-optical disk drivers and also utilized in laser printers, scanners, or display devices. A prism is a typical example of the optical deflector that deflects beams from its original direction. This prism is mostly used with respect to collimating beams in a free space.

A prism-type optical deflector may also have a waveguide shape and be formed of silica, GaAs, InP, $LiTaO_3$, or polymer, etc. In this case, an optical deflector having the waveguide shape refers to a structure that guides beams in a vertical direction and deflects the beams in a lateral direction.

The principle on which the beams are deflected is as follows. When the beams propagate in a certain pattern, a refractive index of a medium in the pattern is changed by an external electric signal. Thus, the beams are deflected according to a refraction characteristic relative to an angle on which the beams are incident at an interface between a region where the refractive index is changed and a region where the refractive index remains unchanged.

Meanwhile, the deflection of beams radiating in a lateral direction through a waveguide can be employed in various optical devices, such as optical switches, arrayed waveguide gratings, and concave gratings. Also, since the waveguide can be monolithically integrated with a light source, it is possible to manufacture very small optical devices. Conventional waveguide-type optical deflectors are discussed in detail in Reference document 1 [IEEE *Journal of Lightwave Technology*, vol. 13, no. 15, October 1995] and Reference document 2 [IEEE *Journal of Lightwave Technology*, vol. 12, no. 8, August 1994]. Reference document 1 makes an analysis of beam propagation in terms of wave optics to show that beams are deflected by a waveguide type optical deflector, and Reference document 2 teaches the optical deflection characteristics of an optical deflector by the help of experiments using gas laser (He—Ne, 635 nm).

Figure 1A:
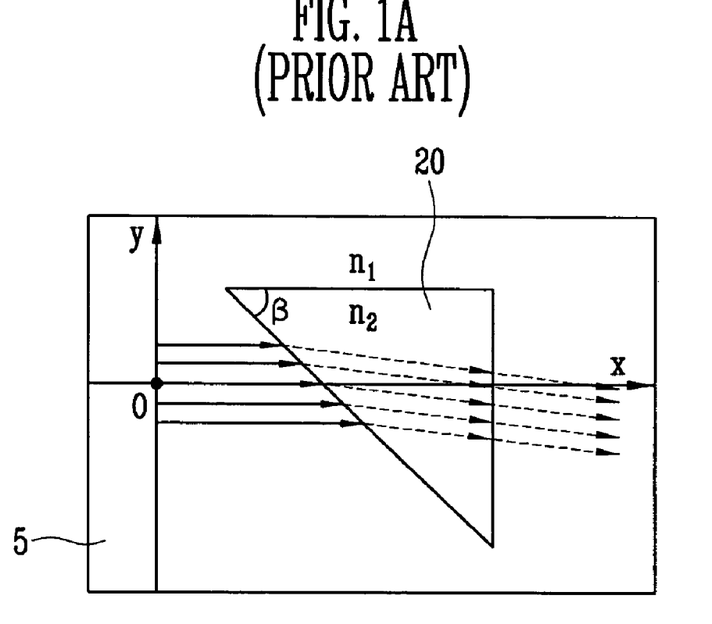
FIGS. 1A and 1B are conceptual diagrams for explaining the optical deflection characteristics of a conventional optical deflector.
Figure 1B:
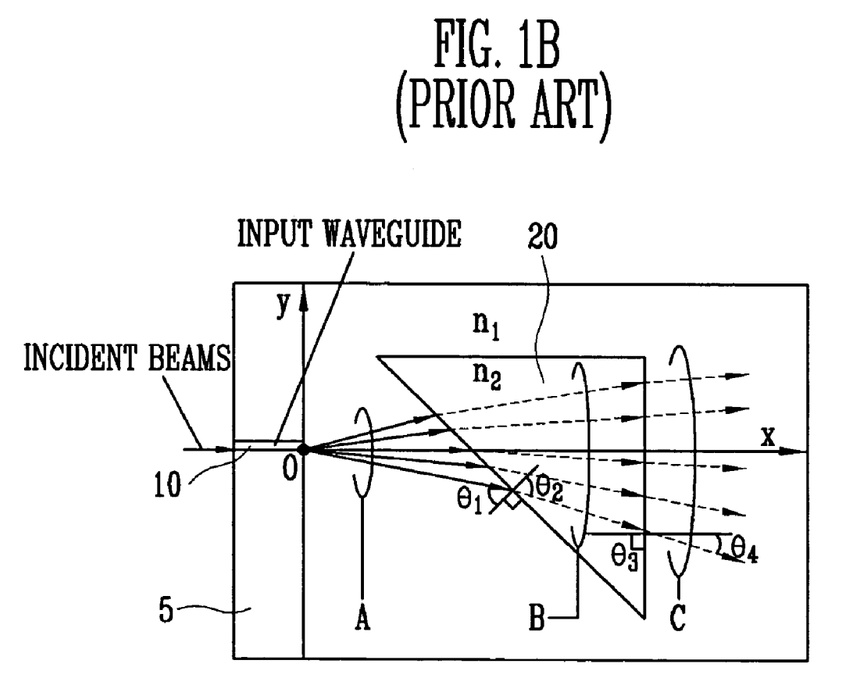

However, the conventional optical deflectors are applied to incident beams that are not radiation beams but collimating beams. Hereinafter, the problem of the conventional optical deflectors will be described in detail with reference to FIGS. 1A and 1B. FIGS. 1A and 1B are conceptual diagrams for explaining the optical deflection characteristics of a conventional optical deflector.

FIG. 1A illustrates the optical deflection characteristics of a triangular-type optical deflector 20 when beams that are transmitted through an optical waveguide (not shown) and incident on the triangular-type optical deflector 20 are collimating beams. Referring to FIG. 1A, since all beams have the same incident angle as an interface, they are refracted and deflected at the same angle. As shown in FIG. 1A, the beams, which propagate in parallel in an x direction in a region 5 having an effective refractive index of $n_1$, are deflected by the triangular-type optical deflector 20 having a predetermined pattern and an effective refractive index of $n_2$. Here, the effective refractive index refers to an effective refractive index of the optical waveguide and varies with a change in the refractive index of a medium in a core layer of the optical waveguide.

FIG. 1B illustrates the optical deflection characteristics of the triangular-type optical deflector 20 when beams that are transmitted through the optical waveguide 10 and incident on the triangular-type optical deflector 20 are beams radiating from the point O. In FIG. 1B, the beams that radiate from the point O are denoted as A, the beams in a pattern of an optical deflector are denoted as B, and the beams that have passed through the pattern of the optical deflector are denoted as C. The radiation beams A pass through an interface between regions having refractive indexes of $n_1$ and $n_2$ and are refracted at an angle of $\theta_2$ according to Snell's law. The beams B pass again through the interface between the regions having refractive indexes of $n_2$ and $n_1$ and are refracted at an angle of $\theta_3$ to $\theta_4$. As a result, the beams A are refracted twice and become the beams C. Accordingly, as can be seen from FIG. 1B, because the radiation beams A are incident on the interface at respectively different incident angles, the radiation beams A are refracted in respectively different directions.

In conclusion, it is difficult to apply the above-described conventional optical deflectors to radiation beams.

SUMMARY OF THE INVENTION

The present invention is directed to an optical deflector, which can deflect beams radiated from a light source.

One aspect of the present invention is to provide an optical deflector for deflecting radiation beams. The optical deflector includes: a peripheral region having a first effective refractive index; and a deflection pattern region having a predetermined shape and a second effective refractive index, wherein the second effective refractive index differs from the first effective refractive index. Here, due to the deflection pattern region having the predetermined shape, the radiation beams are deflected in a direction starting from a certain point.

The position of the certain point may be shifted by a variation in the second effective refractive index, and one of a straight line and a closed curve may be formed by shifting the position of the certain point.

The optical deflector may further include a circular pattern having a third effective refractive index to produce the radiation beams.

Another aspect of the present invention is to provide an optical deflector disposed in an optical waveguide having a lower clad layer, upper clad layers, and a core layer. The optical deflector includes: a peripheral region having a first effective refractive index; and a deflection pattern region having a predetermined shape and a second effective refractive index, wherein the second effective refractive index differs from the first effective refractive index. Here, due to the deflection pattern region, radiation beams are deflected in a direction starting from a certain point.

The deflection pattern region having the predetermined shape may be distinguished from the peripheral region by a difference between currents supplied to portions of the core layer of the respective regions.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

The present invention will now be described more fully hereinafter with reference to the accompanying drawings, in which exemplary embodiments of the invention are shown. This invention may, however, be embodied in different forms and should not be construed as limited to the embodiments set forth herein. Rather, these embodiments are provided so that this disclosure is thorough and complete and fully conveys the scope of the invention to those skilled in the art.

Figure 2A:
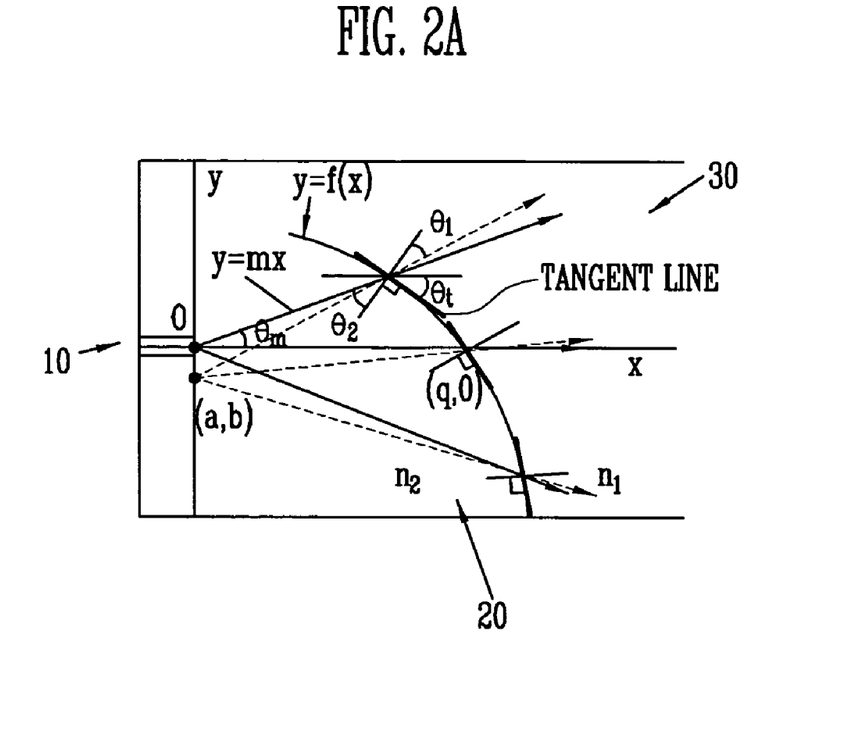
FIGS. 2A and 2B are conceptual diagrams for explaining an optical deflector according to an exemplary embodiment of the present invention.

FIG. 2A is a conceptual diagram of an optical deflector according to an exemplary embodiment of the present invention.

Referring to FIG. 2A, the optical deflector includes a peripheral region 30 having a first effective refractive index $n_1$ and a deflection pattern region 20 having a predetermined shape and a second effective refractive index $n_2$. The second effective refractive index $n_2$ differs from the first effective refractive index $n_1$ so as to form an interface f(x) between the peripheral region 30 and the deflection pattern region 20. In the optical deflector, when incident beams input from an input waveguide 10 are radiated, the beams are deflected in a direction starting from a certain point (a, b) by the interface f(x) of the deflection pattern region 20. Meanwhile, the position of the certain point (a, b) is shifted by a variation in the second effective refractive index $n_2$. That is, a virtual light source (a, b) of the beams that have passed through the deflection pattern region 20 can be represented as an arbitrary locus (e.g., a straight line or a circle) in a limited section according to the variation of the second effective refractive index $n_2$. Each of the first and second effective refractive index $n_1$ and $n_2$ of the peripheral region 30 and the deflection pattern region 20 is not a refractive index of a medium but an effective refractive index of the waveguide. Here, the effective refractive index differs from the refractive index of the medium. The effective refractive index is an eigen mode for a waveguide and varies with the width of the waveguide, the thickness of a core layer, and the refractive index of the core layer. For reference, even though formed of the same material, the inside and outside of the input waveguide 10 may have different refractive indexes because the inside and outside of the input waveguide 10 have different thicknesses from each other.

A method of finding the locus y=f(x) that corresponds to the interface of the deflection pattern region 20 is as follows. We suppose here that the x-intercept of y=f(x) is q and the slope t of the tangent which touches the locus y=f(x) at the point of intersection of an arbitrary radiation beam y=mx (m=tan($\theta_m$)) and the locus y=f(x) is t(=tan(-$\theta_t$)). Here, if the angle between y=mx and the line normal to y=f(x) is expressed by an incident angle $\theta_1$, Equation 1 is expressed as follows:

$$-\theta_t = \frac{\pi}{2} - \theta_2 - \theta_m \qquad (1)$$

As can be seen from the intersection point in the first quadrant of FIG. 2A, since the slope t of the tangent is a negative value and thus, $\theta_t$ is scalar as a positive angle, Equation 1 is obtained. If we take the tangent of both sides of Equation 1 and rearrange the left hand side, Equation 2 should hold:

$$\tan(-\theta_t) = \frac{m\tan(\theta_2) - 1}{m + \tan(\theta_2)} = t = y' \qquad (2)$$

Herein, m(=y/x) and tan($\theta_2$) are variables of x and y, and tan(-$\theta_t$) refers to the slope t of the tangent to the locus y=f(x), so that tan(-$\theta_t$) is a simple differential equation (y') of y with respect to x. In FIG. 2A, if we suppose that $\theta_1$ is a refracting angle of a reflected beam and the reflected beam as illustrated with a dotted line passes through a virtual origin (a, b), y can be expressed as shown in Equation 3:

$$y=\tan(\theta_m-(\theta_1-\theta_2))(x-a)+b \qquad (3)$$

Herein, if $\theta_1$ and $\theta_2$ satisfy Snell's law ($n_1$ sin $\theta_1$=$n_2$ sin $\theta_2$) and $\theta_1$ is expressed using $\theta_2$ and rearranged, Equation 4 is obtained:

$$\left[Bn_2 + \sqrt{(n_1^2 - n_2^2) + (n_1/\tan(\theta_2))^2}\right]\tan(\theta_2) - \qquad (4)$$
$$\left[n_2 - B\sqrt{(n_1^2 - n_2^2) + (n_1/\tan(\theta_2))^2}\right] = 0$$
$$B = \frac{m(x-a)-(y-b)}{m(y-b)+(x-a)}$$

The locus f(x) can be found by substituting tan($\theta_2$) obtained from Equation 4 into Equation 2 and solving a differential equation with an initial value (q, 0). In connection with the method of finding the locus f(x), since tan($\theta_2$) in Equation 4 exists inside and outside the square root, it cannot be solved in a straight-forwarded way. Also, because a general solution of Equation 2 as a differential equation is a combination of x and y, it cannot be expressed as an analytic solution. Accordingly, Equation 4 is numerically solved using self-consistent calculation with respect to tan($\theta_2$), and the locus f(x) is found from Equation 2 using the Runge-Kutta Method. A specific method for numerical analysis employs techniques known to those skilled in the art.

Meanwhile, in a semiconductor optical waveguide, an effective refractive index may be decreased or increased due to supplied current. This is because the effective refractive index depends on the bandgap energy of a core layer relative to the wavelength of an incident beam. Generally, if the core layer is composed of such materials as to increase its bandgap energy more than the wavelength energy of the incident beam, the effective refractive index is reduced due to the supplied current. As the bandgap energy of the core layer relative to the wavelength energy of the incident beam increases, optical loss decreases. However, as the optical loss decreases, a variation of the refractive index also decreases. Therefore, it is desirable to appropriately determine the composition of the core layer considering the variation of refractive index.

Accordingly, although the present invention provides a mathematical model for finding the locus of FIG. 2A in the case of $n_1 > n_2$, the shape of the locus can be changed in the case of $n_1 < n_2$. However, the analyzing process is the same.

Figure 2B:
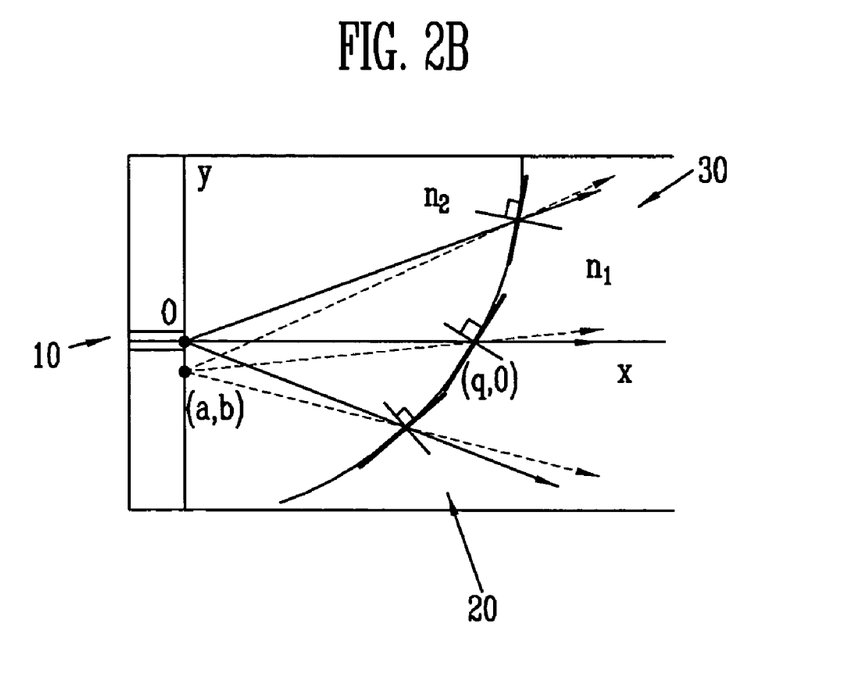

In the meantime, the above-described mathematical model shows only a case where the slope t of the tangent at the point of intersection of the radiation beam and the locus is a negative value, but can be equally applied to a case where it is a positive value. In this case, the shape of the locus f(x) may vary with changes in relations of $\theta_m$ and $\theta_1$ with respect to $\theta_r$ (i.e., variations in Equations 1 and 2). A rough shape of the above-described locus y=f(x) is illustrated in FIG. 2B.

Also, the analysis model of FIG. 2A shows only a case where beams radiate from left to right. Thus, when the beams radiate from right to left, it can be expected that the shape of the locus is changed and symmetric with respect to y-axis.

Figure 3:
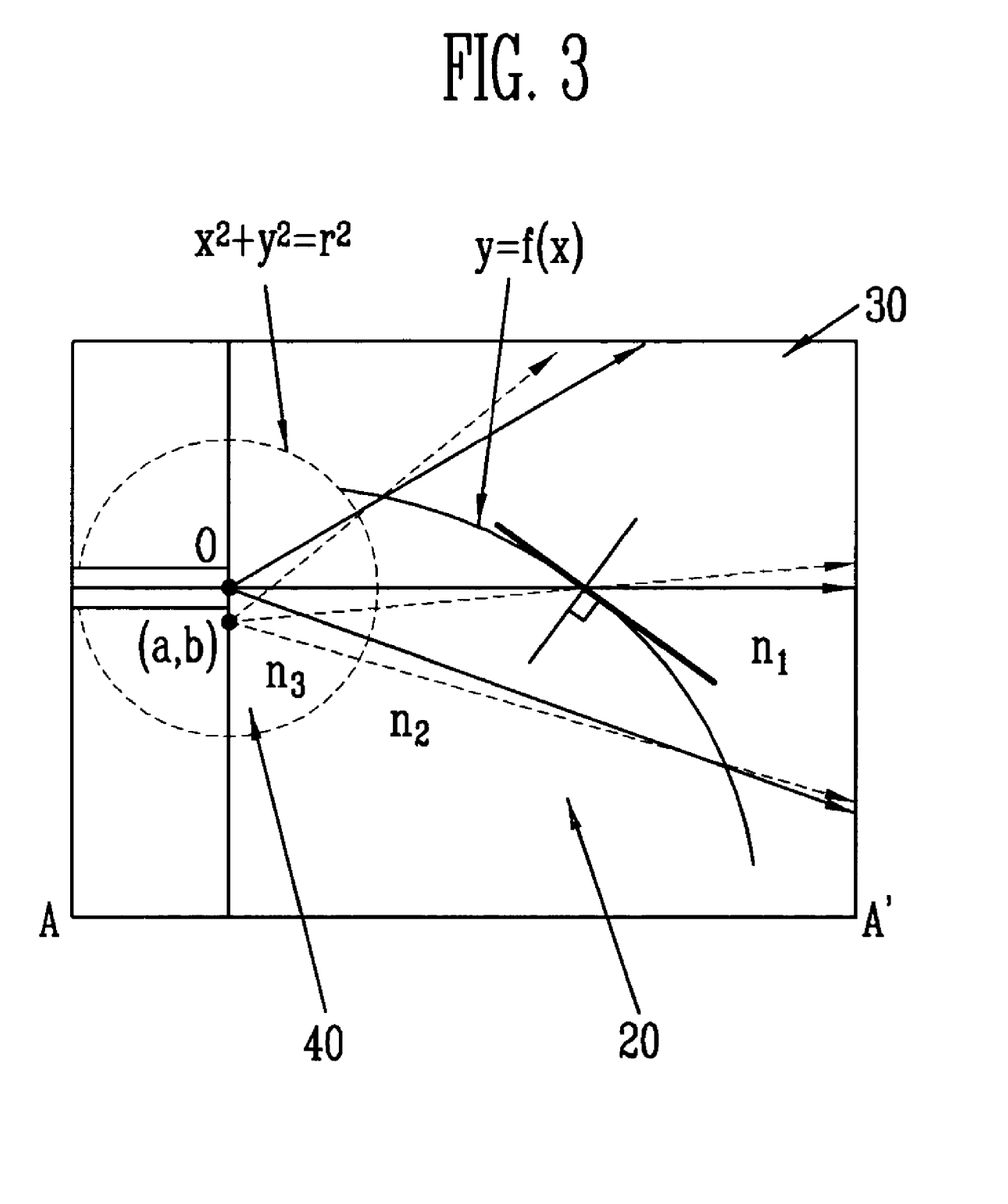
FIG. 3 is a conceptual diagram for explaining an optical deflector according to another exemplary embodiment of the present invention.

FIG. 3 is a conceptual diagram for explaining an optical deflector according to another exemplary embodiment of the present invention.

Referring to FIG. 3, the optical deflector according to the present embodiment of the present invention further includes a circular pattern region 40 having a third effective refractive index $n_3$ between a deflection pattern region 20 and an input waveguide 10 to produce radiation beams. In the circular pattern region 40, when a radiation beam from the origin O passes through a semicircle ($x^2+y^2=r^2$, x>0) that corresponds to an interface between regions having effective refractive indexes $n_3$ and $n_2$, it has an incident angle of 0° and is not refracted because every radiation beam from the origin O is normal to a line tangent to the semicircle. Meanwhile, the third effective refractive index $n_3$ of the circular pattern region 40 may be equal to a first effective refractive index $n_1$ of a peripheral region 30. When radiation beams from the circular pattern region 40 pass through a circle having a radius of r, which corresponds to the interface between the regions having the effective refractive indexes $n_3$ and $n_2$, they are not refracted. After passing through the circle, when the radiation beams pass through an interface that corresponds to a locus f(x), they are refracted. At this time, the refracted beams always pass through a virtual origin (a, b).

That is, unlike in the previous embodiment, in the present embodiment, the origin from which radiation beams are produced exists outside the deflection pattern region 20. In the previous embodiment, the origin from which radiation beams are produced exists inside or at the interface of the deflection pattern region 20 so that the circular pattern region 40 is not required.

Figure 4:
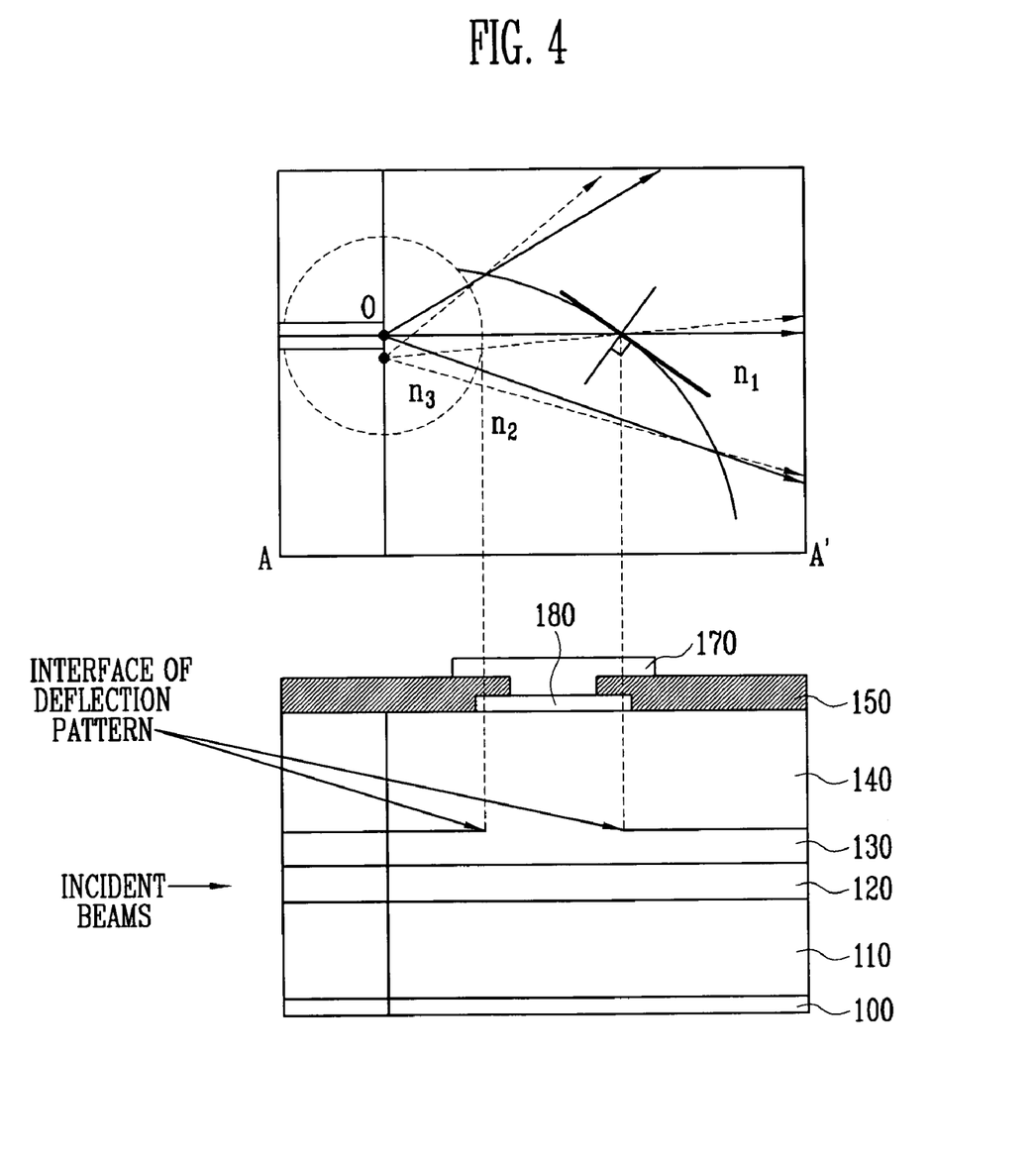
FIG. 4 is a cross-sectional view of an example of an optical deflector according to the present invention.

FIG. 4 is a cross-sectional view taken along line A-A' of FIG. 3, which illustrates an example of the optical deflector according to the present invention. The example of FIG. 4 is formed of an InP-based material.

Referring to FIG. 4, the optical deflector includes an n-metal layer 100, a p-metal layer 170, upper clad layers 130 and 140, a core layer 120, and a lower clad layer 110. Reference numeral 150 refers to an insulating layer.

The n-metal layer 100 may be, for example, a Cr—Au layer, and the p-metal layer 170 may be a Ti—Pt—Au layer to elevate electric conductivity. An InGaAs metal contact layer 180 is heavily doped with p-type impurities to elevate electric conductivity between the p-metal layer 170 and the upper clad layers 130 and 140. The InP upper clad layers 130 and 140 include an n-doped InP layer and a p-doped InP layer, which are isolated from each other as shown in FIG. 4, and an interface between the p-doped InP layer and the n-doped InP layer corresponds to the interface of the deflection pattern shown in FIG. 3. In order to dope p-type or n-type impurities into the InP layer (i.e., a Group III-V material layer), for example, Group IV (Si or Ge) or Group VI elements are used as a source.

In this structure, when the wavelength of an incident beam is 1.55 μm, the refractive index of a medium of each of the clad layers 110, 130, and 140 is equally about 3.17 irrespective of the fact that each of the clad layers 110, 130, and 140 is doped or not. Because the InGaAsP core layer 120 is not doped and has a higher refractive index of a medium than that of each of the clad layers 110, 130, and 140 due to the addition of Ga and As, beams are guided to the InGaAsP core layer 120.

When no current is supplied to this structure, the effective refractive index of the optical waveguide has a certain value. We suppose here the effective refractive index of the waveguide is $n_1$. On the other hand, when predetermined current is supplied to the structure, since a typical p-n junction is formed under forward bias, the current flows through the p-metal layer 170, the metal contact layer 180, the upper clad layers 130 and 140, the InGaAsP core layer 120, the lower clad layer 110, and the n-metal layer 100 in this order.

In this case, the current supplied to the upper clad layers 130 and 140 flow through only the p-doped InP layer in the deflection pattern owing to a potential barrier of the p-doped InP layer and the n-doped InP layer. Thus, the current is supplied only to the deflection pattern so that the refractive index of a medium in the deflection pattern of the core layer 120 is changed. As a result, the effective refractive index of the deflection pattern varies from $n_1$ to $n_2$.

In the above-described structure, instead of forming the deflection pattern in the upper clad layers 130 and 140, an electrode or the metal contact layer 180 may be formed as the deflection pattern. However, in this modified structure, current diffuses in the upper clad layers 130 and 140 due to its diffusion characteristic and thus, a pattern of the current supplied to an active layer differs from the deflection pattern. As a result, the modified structure may be less effective than the structure shown in FIG. 4. Meanwhile, in the structure shown in FIG. 4, the deflection pattern is formed in the upper clad layers 130 and 140 disposed directly on the core layer 120, and current is supplied to the core layer 120 only through the deflection pattern. Thus, the structure shown in FIG. 4 can obtain a stable optical deflection characteristic.

In the meantime, when the wavelength of an incident beam is 1.55 μm, the refractive index of a medium in an InGaAsP material is typically reduced by 0.5 or less with the supply of current to the InGaAsP material. However, when the wavelength of an incident beam in an InP/InGaAsP material is not 1.55 μm or when materials (GaAs/AlGaAs, GaAs/InGaAs, or the like) for semiconductor optical devices other than the InP/InGaAsP material are used, a variation in the refractive index of a medium due to current supply becomes different. In addition to the current supply, the refractive index of a medium may be increased or reduced due to voltage, an electro-optic effect, or an acousto-optic effect.

EXPERIMENTAL EXAMPLE

A simulation was conducted using the structure shown in FIG. 3. FIGS. 5A through 5C and 6A and 6B are graphs of simulation results using the structure of the optical deflector shown in FIG. 3.

Figure 5A:
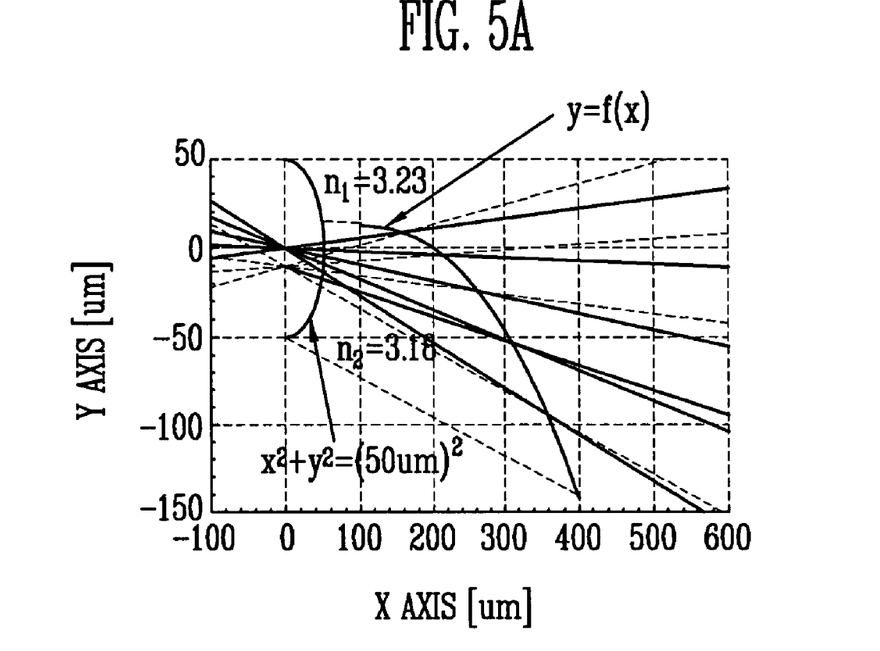
FIGS. 5A through 5C and 6A and 6B are graphs of simulation results using the structure of the optical deflector shown in FIG. 3.
Figure 5B:
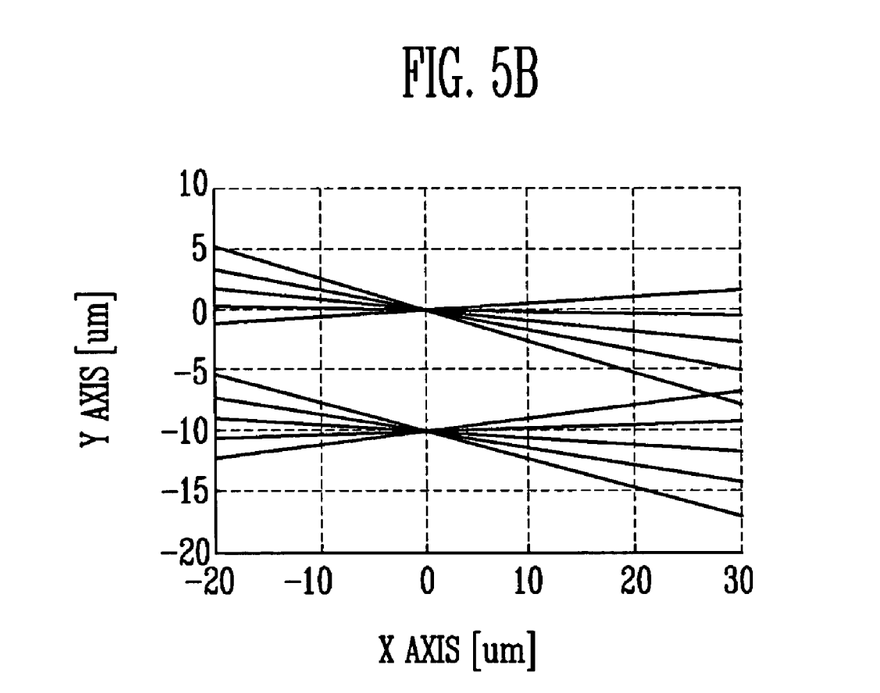
Figure 5C:
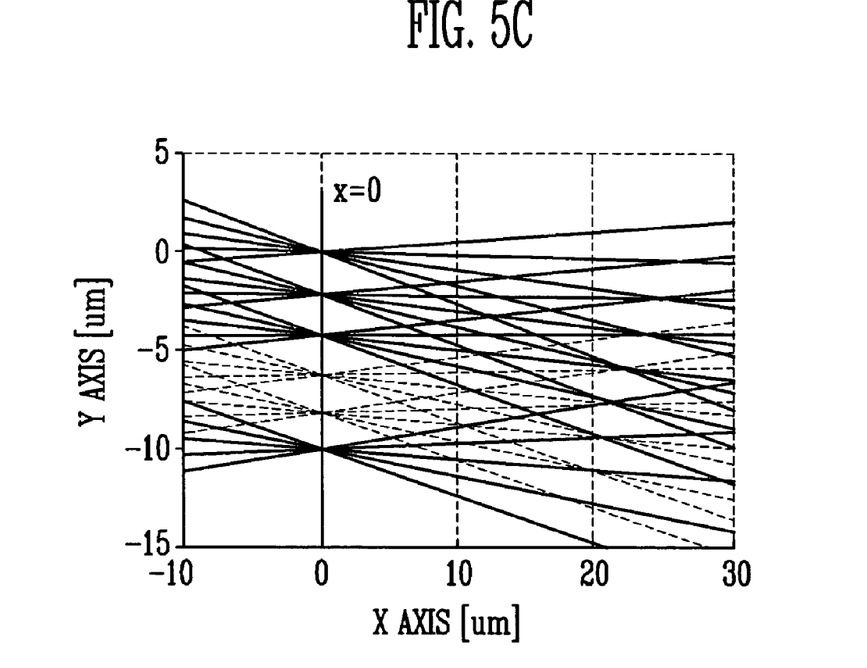

Referring to FIG. 5A, a locus f(x) has the x-intercept of 200 μm, the effective refractive index $n_1$ of the peripheral region (30 of FIG. 3) is 3.23, the effective refractive index $n_2$ of the deflection pattern (20 of FIG. 3) is 3.18, and the virtual origin (a, b) is (0, −10 μm). Also, FIG. 5A illustrates the ray tracings of beams that are refracted by the locus f(x). In FIG. 5A, solid lines refer to the ray tracings of beams when the refractive index of a medium remains unchanged (i.e., $n_2$=3.23), and dotted lines refer to the ray tracings of beams when the refractive index of the deflection pattern 20 is changed (i.e., $n_2$=3.18). Referring to FIG. 5B, which is a magnified view of the vicinity of the virtual origin (a, b) shown in FIG. 5A, it can be observed that after passing through the deflection pattern 20, the refracted beams focus on the point (0, −10 μm). FIG. 5C illustrates reflected beams in the structure shown in FIG. 3 when the refractive index $n_2$ of the deflection pattern 20 gradually decreases from 3.23 to 3.18 at intervals of 0.01. Referring to FIG. 5C, it can be seen that the position of a light source (a, b) from which the reflected beams are produced is virtually shifted from (0, 0) to (0, −10 μm) along the y-axis.

Figure 6A:
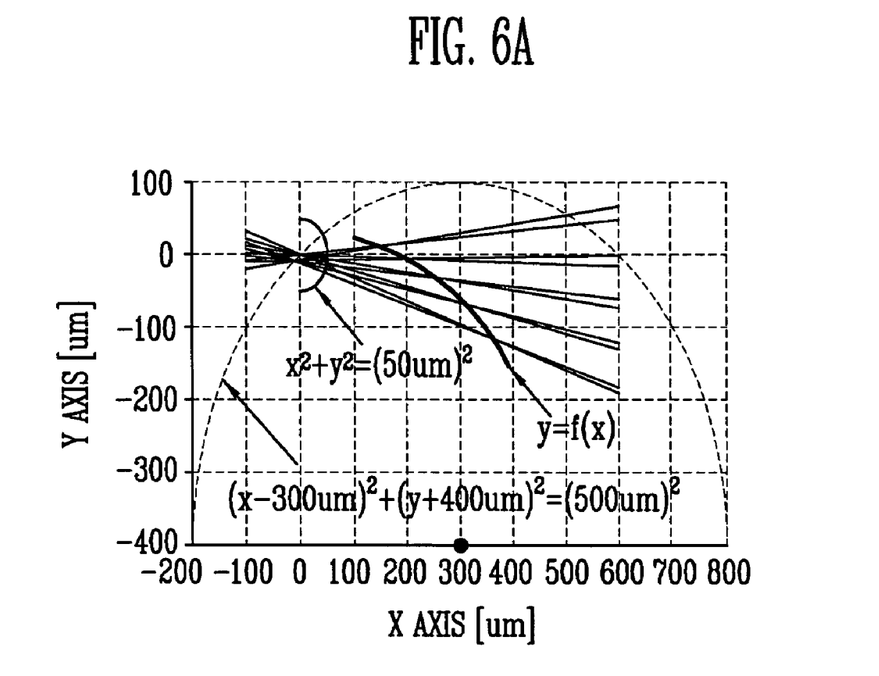
Figure 6B:
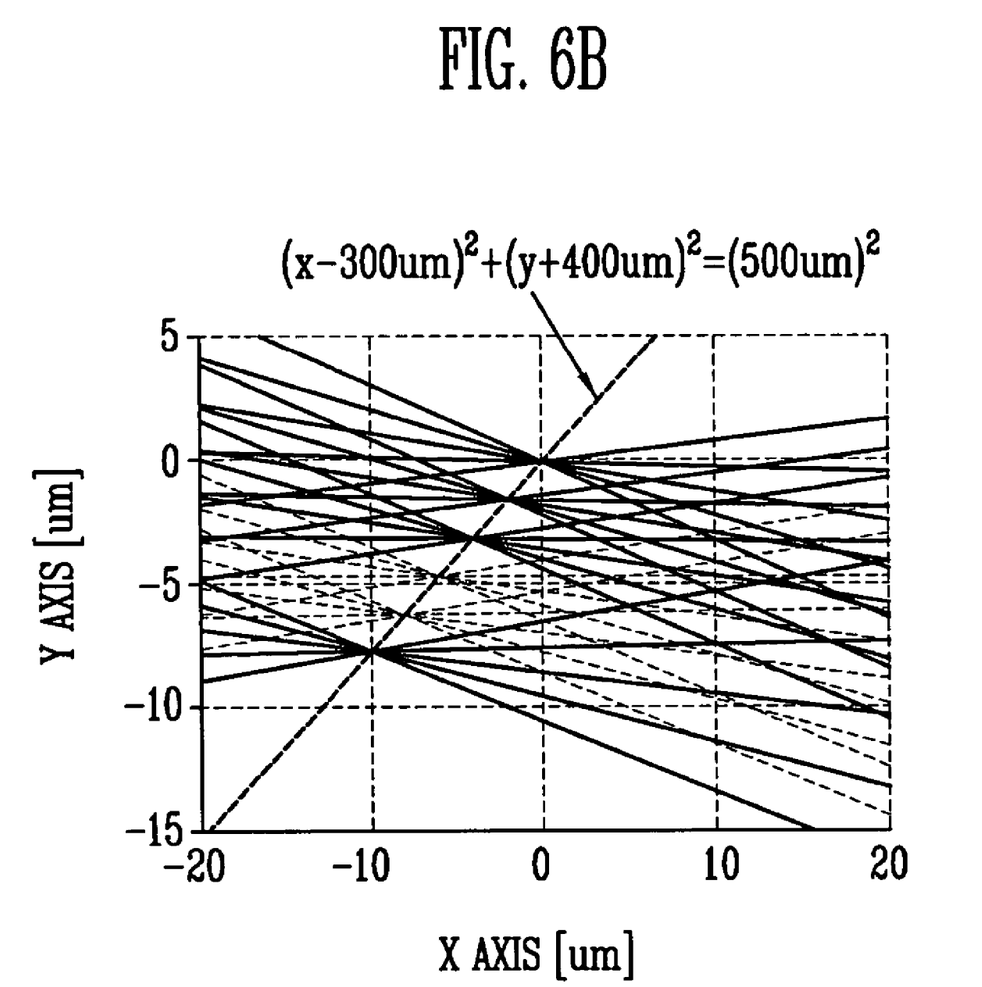

Meanwhile, the locus f(x) can be designed such that the position of light source (a, b) from which the reflected beams are produced is shifted along an arbitrary locus other than a straight line. For example, f(x) can be found such that the position of a light source from which reflected beams are produced is shifted along a circle with the center ($c_1$=300 μm, $c_2$=−400 μm) and a radius R of 500 μm. When $n_1$ is 3.23, $n_2$ is 3.18, and the x coordinate (a) of the light source is −10 μm, the y coordinate (b) becomes about −7.7 μm from Equation $b=-c_2+\sqrt{R^2-(a-c_1)^2}$. The analysis results of the structure are shown in FIGS. 6A and 6B, from which it can be conformed the light source of reflected beams virtually shifts along a circle with a radius R of 500 μm.

Although the above description deals with only the straight line and the circle, it can be also applied to other arbitrary locus, such as an ellipse or a hyperbola, in the x-y coordinate system. Also, the locus, which is shown in FIG. 2 to analyze the y=f(x), may be applied to a case where the slope of the tangent is a positive value or a structure that is symmetric with respect to the y-axis.

COMPARATIVE EXAMPLE

Figure 7:
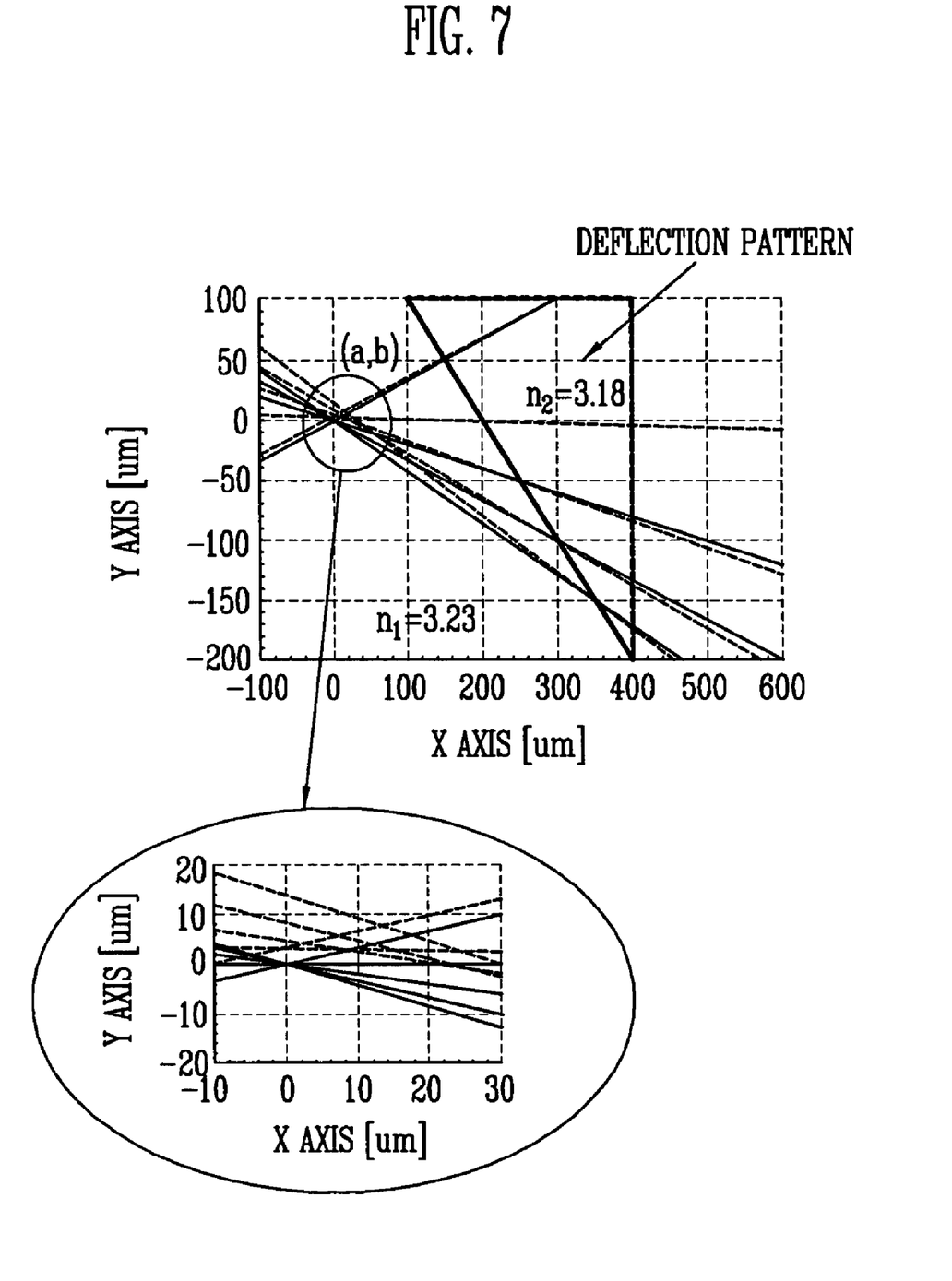
FIG. 7 is a graph of simulation results showing that radiated beams are deflected in a triangular deflection pattern.

FIG. 7 is a graph of simulation results showing that radiated beams are deflected in a triangular deflection pattern. The triangular deflection pattern has a top side of 300 μm and a height of 300 μm (b=45°), and the x-intercept of an interface between the triangular deflection pattern and a peripheral region is 200 μm. Also, the effective refractive index $n_1$ of the peripheral region is 3.23, and the effective refractive index $n_2$ of the deflection pattern is 3.18. In FIG. 7, solid lines refer to the ray tracings of beams when the refractive index of a medium remains unchanged (i.e., $n_1$=3.23), and dotted lines refer to the ray tracings of beams when the refractive index of the deflection pattern is changed (i.e., $n_2$=3.18).

Referring to a magnified view of the vicinity of a virtual origin (a, b), it can be observed that reflected beams do not focus on a point. In this case, when radiation beams pass through the deflection pattern, they are refracted due to a variation of the refractive index of the pattern. However, after passing through the deflection pattern, when they are retraced, they do not focus on one point. Therefore, the deflection pattern shown in FIG. 7 cannot be used for an optical deflector.

In the exemplary embodiments of the present invention, it is described that the deflection pattern and the peripheral region are formed of the same material, and the effective refractive index of the deflection pattern is changed by varying the refractive index of a medium in a portion of a core layer that corresponds to the deflection pattern with the application of an electric signal to the deflection pattern. However, it is obvious that the present invention is not limited thereto.

According to the present invention as described above, a deflection pattern deflects radiation beams, and the refractive index in the deflection pattern is changed with the application of an external electric signal so that the position of a light source from which the deflected beams are produced can be virtually shifted.

A locus, which corresponds to an interface of the deflection pattern, can be designed such that the position of the light source can be shifted in one of various forms, such as a straight line, a circle, an ellipse, a parabola, etc., according to a variation in the refractive index of the deflection pattern. By using this locus, the deflection pattern can be utilized in various optical communication devices and optical processing devices, for example, optical switches, arrayed waveguide gratings, concave gratings, etc.

Further, the present invention proposes not only a deflection pattern structure that can be used as an optical deflector with respect to radiation beams from a light source, but also a modeling method for the analysis of the deflection pattern structure and several specific examples of the pattern structure.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

What is claimed is:

1. An optical deflector for deflecting radiation beams comprising:
   a peripheral region having a first effective refractive index; and
   a deflection pattern region having a predetermined shape bordering the peripheral region and having a second effective refractive index being different from the first effective refractive index,
   wherein the radiation beams incident on a first point of the deflection pattern region are deflected in a direction starting from a different point other than the first point due to the deflection pattern region having the predetermined shape.

2. The optical deflector according to claim 1, wherein the position of the certain point is shifted by a variation in the second effective refractive index.

3. The optical deflector according to claim 2, wherein one of a straight line and a closed curve is formed by shifting the position of the certain point.

4. The optical deflector according to claim 1, further comprising a circular pattern having a third effective refractive index to produce the radiation beams.

5. The optical deflector according to claim 4, wherein the third effective refractive index is equal to the first effective refractive index.

6. An optical waveguide comprising:
   a lower clad layer;
   a core layer on the lower clad layer;
   an upper clad layer on the core layer; and
   an optical deflector comprising:
      a peripheral region having a first effective refractive index; and
      a deflection pattern region having a predetermined shape bordering the peripheral region and having a second effective refractive index, the second effective refractive index being different from the first effective refractive index,
   wherein radiation beams incident on a first point of the deflection pattern region are deflected in a direction starting from a different point other than the first point due to the deflection pattern region.

7. The optical waveguide according to claim 6, wherein the deflection pattern region having the predetermined shape is distinguished from the peripheral region by a difference between currents supplied to portions of the core layer of the respective regions.

* * * * *